United States Patent [19]

Asano et al.

[11] Patent Number: 5,885,535

[45] Date of Patent: Mar. 23, 1999

[54] PROCESS FOR EXTRACTING AND RECOVERING SILVER

[75] Inventors: Satoshi Asano; Kaoru Terao, both of Niihama, Japan

[73] Assignee: Sumitomo Metal Mining Company, Limited, Tokyo, Japan

[21] Appl. No.: 8,492

[22] Filed: Jan. 16, 1998

[30] Foreign Application Priority Data

May 27, 1997 [JP] Japan ..................................... 9-136525

[51] Int. Cl.$^6$ ..................................................... C22B 11/00
[52] U.S. Cl. ................................................. 423/24; 75/370
[58] Field of Search .............................. 423/24; 75/370, 75/371

[56] References Cited

U.S. PATENT DOCUMENTS

| | | | |
|---|---|---|---|
| 3,940,261 | 2/1976 | Dannelly et al. | 75/370 |
| 4,623,522 | 11/1986 | Rickelton | 423/24 |
| 4,721,605 | 1/1988 | Brown et al | 423/24 |

FOREIGN PATENT DOCUMENTS 63-274705  11/1988  Japan ....................................... 75/370

*Primary Examiner*—Steven Bos
*Attorney, Agent, or Firm*—Watson Cole Grindle Watson, P.L.L.C.

[57] ABSTRACT

A process for extracting and separating silver safely and selectively from a raw material containing slightly soluble silver compounds and recovering silver from the extract in a simple manner without resorting to electrolysis or a special reducing agent, and further recovering high-purity silver, includes mixing the raw material with an organic solvent solution of an organophosphorus compound containing in the molecule sulfur in the form of $S^{2-}$ ions, thereby extracting silver into an organic phase simultaneously with dissolving the slightly soluble silver compounds, stripping the silver from the organic phase containing the extracted silver with an aqueous solution of alkali sulfite and forming a stripping solution, and reducing the stripping solution to separate silver therefrom.

18 Claims, No Drawings

PROCESS FOR EXTRACTING AND RECOVERING SILVER

BACKGROUND OF THE INVENTION

1. Field of the Invention

The present invention relates to a process for separating silver for recovery and purification by extraction from solids containing slightly soluble silver compounds which occur during smelting of noble metals or during disposal of wastes of plating solution and developing solution.

2. Description of the Related Art

One typical way of recovering silver from aqueous solutions or solids by hydrometallugical process is by conversion of silver into a slightly water-soluble silver compound such as silver chloride. This process offers the advantage of being able to separate and recover silver from most coexisting metals including noble metals. Unfortunately, the recovered silver compound (in the form of chloride or sulfate) is difficult to purify directly by hydrometallugical process because it is only slightly soluble not only in water but also in acid and alkali.

There are some known processes for separating such slightly soluble silver compounds from coexisting other compounds or solids. They include the ammonia leaching process and thiosulfate leaching process by which silver is dissolved in the form of stable complex compounds. Unfortunately, the ammonia leaching process has the disadvantage that silver ions react with ammonia to give unstable explosive silver compounds such as silver fulminate when the solution is allowed to stand. This prevents the leachate from residing or being recycled in the system. On the other hand, the thiosulfate leaching process tends to precipitate slightly soluble silver sulfide when the leachate is allowed to stand. This tendency is strong when the leachate decreases in pH and increases in temperature. An additional disadvantage is that metallic silver recovered from the leachate by electrolysis or reduction contains much sulfur.

Moreover, the above-mentioned two leaching processes involve a problem in common. The problem is that many other complex-forming elements are leached out together with silver during leaching. Consequently, the silver recovered from the leachate by reduction contains these elements and needs repurification by pyrometallugical process or electrolysis. This object is achieved only by the aid of a strong reducing agent because silver exists in the form of stable complex ions in the leachate. The use of a strong reducing agent leads to an increased production cost and poses a problem with the accumulation of reducing agent or decomposed products thereof in the leachate, which makes it difficult to repeatedly use the stripping solution after the silver recovery. On the other hand, the collection by electrolysis needs additional equipment and increases the residence time for silver. In addition, it prevents the leaching solution from being recycled on account of decomposition by anodic oxidation.

There is another reducing process applicable to the ammonia leachate which employs hydrogen at a high temperature under a high pressure. This process, however, is not of practical use because of the possibility of explosion by hydrogen and the danger of forming explosive silver compounds (such as silver fulminate) as mentioned above.

In the meantime, it is known that an organophosphorus compound containing in the molecule sulfur in the form of $S^{2-}$ ions extracts silver ions from an aqueous solution of silver. In practical application, it is necessary to dissolve silver (contained in solids) in nitric acid to give an aqueous solution of silver nitrate. Unfortunately, nitric acid, however dilute it might be, easily degrades (by oxidation) the above-mentioned organophosphorus compound. Therefore, this process cannot be used to recover silver from solids an industrial scale.

OBJECT AND SUMMARY OF THE INVENTION

The present invention was completed in view of the above foregoing. It is an object of the present invention to provide a process for separating silver from solids containing slightly soluble silver compounds. This process permits only silver to be extracted and separated selectively without forming explosive compounds and slightly soluble sulfides. Silver of high purity can be recovered simply and economically from the extract without the necessity of using a reducing agent or electrolysis.

The gist of the present invention resides in a process for extracting and recovering silver which includes mixing a raw material containing slightly soluble silver compounds with an organic solvent solution of an organophosphorus compound containing in the molecule sulfur in the form of $S^{2-}$ ions, thereby extracting silver into the organic phase simultaneously with dissolving the slightly soluble silver compounds, strip-extracting silver from the organic phase containing the extracted silver with aqueous solution of alkali sulfite, and separating silver by reduction from the stripping solution.

In a preferred embodiment of the present invention, the organophosphorus compound (containing in the molecule sulfur in the form of $S^{2-}$ ions) used to extract silver is trialkylphosphine sulfide, dialkylmonothiophosphinic acid, dialkyldithiophosphinic acid, or alkyl monothiophosphate.

In the case where the raw material containing slightly soluble silver compounds contains metal impurities readily reducible by silver, the above-mentioned process of the present invention may be modified such that before mixing with the organic solvent solution of an organophosphorus compound containing in the molecule sulfur in the form of $S^{2-}$ ions, the raw material containing slightly soluble silver compounds is mixed with a reducing agent so that the impurities readily reducible by silver are partly reduced to a simple substance and removed.

In another preferred embodiment of the present invention, the mixing of the raw material containing slightly soluble silver compounds with the organic solvent solution of an organophosphorus compound containing in the molecule sulfur in the form of $S^{2-}$ ions is accomplished uniformly by adding, in the presence of an aqueous phase, a solvent which dissolves both the organic phase and the aqueous phase, or by adding a nonionic surface active agent which does not react with metal ions.

In another preferred embodiment of the present invention, the organic phase into which silver has been extracted is washed with an aqueous solution of complex-forming agent such as aminocarboxylic acid compound or contacted with activated carbon so as to reduce impurities further. In another preferred embodiment, the recovery of silver by reduction from the stripping solution is accomplished by keeping the stripping solution at pH 10 or above and at 60° C. or above.

The term "raw material containing slightly soluble silver compounds" means any slightly soluble silver comnound such as silver halide and any solid substance containing slightly soluble silver compounds. Examples of raw material containing slightly soluble silver compounds include residues in the form of slurry or granules which occur after the smelting of noble metals and the treatment of plating solution and developing solution.

DESCRIPTION OF THE PREFERRED EMBODIMENTS

The process of the present invention is based on the principle that an organophosphorus compound containing in the molecule sulfur in the form of $S^{2-}$ ions selectively forms a stable silver compound. Therefore, it employs as an extractant an organic solvent solution of the organophosphorus compound, thereby dissolving slightly soluble silver compounds in a solid raw material containing other elements than silver or other compounds than silver compounds and simultaneously extracting silver into the organic solvent.

The step of extraction is followed by stripping with aqueous solution of alkali sulfite and then reduction which causes metallic silver to separate out. If the stripping solution is adjusted to pH 10 or above, the sulfite ions reduce silver. This reaction is used to recover silver.

A detailed description is given below of the process for extracting, separating, and recovering silver according to an embodiment of the present invention in which the organophosphorus compound containing in the molecule sulfur in the form of $S^{2-}$ ions is triisobutylphosphine sulfide (TIBPS for short hereinafter), which is one kind of trialkylphosphine sulfide, and the slightly soluble silver compound is silver chloride (AgCl).

The first step for extraction of silver from a raw material containing slightly soluble silver compounds is to dissolve TIBPS (which is solid at room temperature) in an organic solvent which solubilizes TIBPS and its silver salt adduct. Then, the organic solvent solution of TIBPS is mixed with a raw material containing slightly soluble silver compounds. The organic solvent is usually a hydrocarbon solvent. It may be incorporated with a modifier such as p-nonylphenol to increase its dissolving power for silver salt adducts by a factor of n×10 g/L (where n is an arbitrary number from 1 to 10) in terms of silver.

When a raw material containing slightly soluble silver compounds is mixed with the organic solvent solution of TIBPS, the slightly soluble silver compound forms an adduct with TIBPS as shown by the chemical equation below. The adduct dissolves and moves to the organic phase.

$$2R_3PS + AgCl \rightarrow (R_3PS)_2 \cdot AgCl \qquad (1)$$

(where $R_3PS$ stands for TIBPS mentioned above. The same shall apply hereinafter.)

Extraction in this way does not need pH adjustment, nor does it give rise to explosive or slightly soluble by-products. It is desirable that the raw material containing slightly soluble silver compounds be used in the form of powder or slurry so that it has a large area of contact with the organic solvent solution.

In the case where TIBPS (which is neutral) is replaced by an acid extractant of another organophosphorus compound containing sulfur in the form of $S^{2-}$ ions, the extractant will release an acid as the result of silver extraction. However, pH adjustment with an alkali is not necessary so long as the concentration of extracted silver is about 60 g/L even though the acid is a strong acid such as hydrochloric acid. In addition, an acid extractant of sulfur-containing organophosphorus compound does not necessarily need a diluent because it is liquid at room temperature.

The above-mentioned extraction proceeds smoothly at room temperature even though silver is in the form of slightly soluble compounds. Even silver chloride (whose solubility in water is only 1.3 mg/L at 15° C.) as the slightly soluble silver compound is dissolved in the organic solvent solution of TIBPS almost completely within 10 minutes at room temperature if it is in the form of readily dispersible powder or slurry. Dissolution and extraction will be easier in the case of soluble silver compound such as silver sulfate.

The organic phase undergoes a subsequent step for the recovery of metallic silver by direct reduction with a reducing agent or by stripping, followed by reduction or electrolysis. The stripping is carried out by using any of thiosulfate, thiocyanic acid, thiourea, ammonia, and sodium sulfite, which are used for leaching silver chloride, etc.

The direct reducing process needs an alkaline strong reducing condition if the organic phase contains a silver compound such as silver chloride which is difficult to reduce. Under such a condition, the organic phase partly decomposes to give a sulfide. This restricts the form of the slightly soluble silver compound to which the direct reducing process can be applied. On the other hand, the stripping process encounters a problem of increasing the sulfur content or nitrogen content in the metallic silver recovered by reduction because the silver compound in the aqueous phase is unstable if other stripping solution than alkali sulfite is used. Therefore, the stripping should be carried out with an aqueous solution of alkali sulfite such as sodium sulfite.

After extraction into the organic solvent, silver is present in the form of adduct with TIBPS. Upon stripping with an aqueous solution of sodium sulfite, the silver adduct changes into a sulfito complex (as shown in the chemical equation below) which moves to the aqueous phase.

$$(R_3PS)_2 \cdot AgCl + 2Na_2SO_3 \rightarrow Na_3[Ag(SO_3)_2] + NaCl + 2R_3PS \qquad (2)$$

The silver sulfito complex does not form any sulfide during storage or due to pH change because it is free from $S^{2-}$ ions, nor does it form any explosive unstable compound. Moreover, unlike other backward extractants, sodium sulfite offers an additional advantage of reducing silver as shown in the following chemical equation, thereby permitting the recovery of metallic silver, if the aqueous solution containing silver sulfito complex is increased in pH.

$$2Na_3[Ag(SO_3)_2] + 2NaOH \rightarrow 2Ag + Na_2SO_4 + 3Na_2SO_3 + H_2O \qquad (3)$$

This reduction reaction increases in speed with the increasing pH or the increasing temperature at the same pH. In industrial operation, therefore, it is desirable to keep pH 10 or above and 60° C. or above. It is possible to reduce silver into metallic silver almost completely at pH 12 or above at 90° C. for about 1 hour. The chemical equation above indicates that at least one equivalent of alkali is required to reduce silver; however, in actual operation about half an equivalent of alkali is enough to reduce silver completely at pH 10 or above where the sulfite produces the buffer action.

The above-mentioned reduction reaction gives rise to metallic silver in the form of silvery white powder instead of fine dark powder resulting from reduction with formalin. The powder has a particle diameter not smaller than n/10 mm (wherein n is an arbitrary number of 1 to 10), is good for handling and hence is very easy to filter and wash.

If the extraction is to be practiced industrially according to the chemical equation (1) in the present invention, it is important to mix uniformly the organic phase, the raw material containing slightly soluble silver compounds, and water which is usually contained in the raw material. To achieve uniform mixing, it is desirable to form a powerful liquid flow in the upward and downward directions, unlike ordinary solvent extraction. Therefore, a marine-type or pitched turbine is preferable to a two-paddle vane.

However, there often exists an instance where uniform mixing is difficult to achieve practically only by mechanical stirring because the raw material contains firm coagulates of solid particles. Remedies to this problem are explained below.

The first remedy is the addition of a solvent which dissolves both the organic phase and the aqueous phase, thereby decreasing the interfacial tension between the two phases and achieving their complete mixing (if possible). This remedy is very effective in the case where silver compounds (which are usually hydrophilic) suspend in the aqueous phase but do not suspend in the organic phase, so that reactions hardly take place. Such a solvent includes, for example, acetone, methanol, ethanol, isopropanol, DMF, and DMSO, of which methanol is desirable because of its low price. Incidentally, it is possible to economically recover alcohol from a dilute aqueous solution by pervaporation.

The second remedy is the addition of a nonionic surface active agent, especially the one which is soluble in water but is hardly extracted into the organic phase. An anionic surface active agent is not desirable because it reacts with soluble salts to form insoluble precipitates (thereby decreasing in surface activity). A cationic surface active agent is not desirable either because it reacts with metal ions to form compounds soluble in the organic solvent.

Preferred examples of the surface active agent include EMULGEN PI-20T (polyoxethylene-nonyl-phenyl-ether), EMULGEN 906(polyoxethylene-nonyl-phenyl-ether); and CLEANTHROUGH LC-2500 (aromatic glycol surfactant) (all from Kao Corporation). Of these examples, the last one is particularly desirable because it hardly forms an emulsion with the organic phase. The amount of the surface active agent is usually 1 to 20 g for one liter of the organic phase, depending on the ratio of the organic phase to the water content in the raw material. The surface active agent in an excess amount presents difficulties in separation of the organic phase from the aqueous phase. The result of the opposite case is insufficient mixing.

Extraction by uniform mixing by the aid of a solvent (which dissolves both the organic phase and the aqueous phase) or a surface active agent is followed by separation of the organic phase, the aqueous phase, and solid residues from one another. Usually, this step is accomplished by separating solid residues from the mixture of the organic and aqueous phases by filtration with suction or pressure or by centrifugation, and subsequently separating the organic phase from the aqueous phase, and finally washing the residues. Alternatively, it is possible to separate the three phases simultaneously and continuously by centrifugation, while washing residues continuously before discharge.

In the case where extraction is carried out by the aid of a solvent which dissolves both the organic phase and the aqueous phase, water is added to the liquid phase from which solid residues have been separated, so that the organic phase separates from the aqueous phase and the solvent (which dissolves both the organic phase and the aqueous phase) moves to the aqueous phase. In the case where a surface active agent is used, part of the organic phase may suspend in the aqueous phase. If this happens, the organic phase can be completely recovered by using a coalescer provided with an oil-water separating membrane. Residues may be washed with a solvent which dissolves both the organic phase and the aqueous phase or with an aqueous solution of surface active agent.

As mentioned above, the process of the present invention permits efficient recovery of silver by uniform mixing of the organic phase and the aqueous phase. The recovered silver contains a small amount of gold and other impurities, but it can be purified further in the following manner to the same level as electrolytically purified silver.

If the raw material containing slightly soluble silver compounds is alloy scrap or ore (naturally occurring compound), it often contains impurities which are reduced more easily than silver. These impurities include gold which behaves like silver. Therefore, it is difficult to remove gold completely from silver chloride simply by washing. Usually, 10–100 ppm of gold (based on the amount of silver) remains unremoved. If this gold enters the organic phase for extraction in the process of the present invention, it is stripped backward into the aqueous phase and finally enters the recovered silver.

To prevent this trouble, the raw material is previously treated with a small amount of weak reducing agent, so that impurities (such as gold which is reduced at a higher potential than silver) are selectively reduced into metal or simple substance. Examples of such a reducing agent include sulfur dioxide, sulfite, hydrazine and salt thereof, and oxalic acid, which are commonly used for selective recovery of gold. Of these examples, sulfite (such as sodium hydrogen sulfite) is most desirable because of its sufficiently high reaction rate, its reaction product having no effect on the subsequent steps, and its commercial availability. The reducing potential should be about 100–200 mV with respect to the Ag/AgCl electrode. A potential lower than 100 mV causes silver to be gradually reduced, and a potential higher than 200 mV prevents the complete reduction of gold. Incidentally, the reduced gold (in the metallic form) is not extracted into the organic phase during extraction in the process of the present invention but is recovered separately from extraction residues by recycling to the dry process.

In the process of the present invention, impurities are separated more selectively than in the case of leaching owing to the organophosphorus compound, especially TIBPS, which contains sulfur in the form of $S^{2-}$ ions. However, trace amounts of impurities are extracted. Impurities extracted into the organic phase can be effectively removed by washing the organic phase or by absorption with activated carbon. This additional step helps purify silver further.

Washing of the organic phase to remove impurities is best achieved by the aid of a compound composed of amine and acetic acid, especially an aminocarboxylic acid compound such as ethylenediaminetetraacetic acid (EDTA). Acids are poor in washing power. Other unsuitable compounds are thiourea, thiosulfate, sulfite, and thiocyanate (which contain sulfur and form a complex) and cyanides and ammonia water (which also strip silver). Treatment with activated carbon is effective in removing impurities from the organic phase because impurities (such as gold) are more readily adsorbed by activated carbon than silver.

The above-mentioned steps permit the recovery of highly purified silver. However, in the case where the organic phase is stripped with aqueous solution of alkali sulfite and the resulting stripping solution undergoes reduction for the recovery of silver, the recovered metallic silver may be contaminated with trace amounts of impurities originating from the aqueous solution of alkali sulfite or impurities which have remained or entered during the steps of separation and filtration. It is important to eliminate the source of external contamination. Such contaminants may be effectively removed by washing the silver powder with an acid.

An adequate acid is hydrochloric acid, which is non-oxidative and is able to wash the silver surface completely by slight dissolution. The resulting silver powder may be purified by any known melting method or flux method in the case where the final product in the form of lump is acceptable.

EXAMPLE 1

A sample of slime formed at an anode during electrolytic refining of copper was washed with water and suspended in 5N hydrochloric acid so that the resulting slurry had a concentration of 400 g/L. The slurry was heated to 90° C. and was bubbled with chlorine gas until the maximum potential was reached. The residues remaining after leaching with chlorine were washed with 5N hydrochloric acid. Thus there was obtained a readily dispersible silver concentrate having the composition as shown in Table 1. It was used in the wet state as the raw material containing slightly soluble silver.

TABLE 1

Composition of silver concentrate (residues remaining after chlorine leaching) (wt % in wet state)

| Au | Cu | Pb | Se | Ag | Pt | Pd | Rh |
|---|---|---|---|---|---|---|---|
| 0.01 | 0.1 | 13.5 | 0.1 | 40.9 | 0.06 | <0.01 | <0.01 |
| Ni | As | Sb | Bi | Te | Fe | Sn | $SO_4$ |
| 0.35 | 0.38 | 6.17 | 4.04 | 0.06 | 0.26 | 1.02 | <0.05 |

In an aromatic hydrocarbon solvent ("CLEANSOL G") (hexyl benzene) from Nisseki Corporation) were dissolved triisobutylphosphine sulfide as the organophosphorus compound containing in the molecule sulfur in the form of $S^{2-}$ ions ("CYANEX 471X (triisobutylphosphine oxide) from Cytec Corporation) in an amount of 444 g/L (equivalent to 1.87 mol/L) and p-nonylphenol as the modifier in an amount of 53.5 g/L, to give an organic solvent solution. The above-mentioned raw material containing slightly soluble silver (11.7 g), the organic solvent solution (79.5 ml), and water (20 ml) were mixed together. The mixture was shaken for 1 hour so that silver was extracted into the organic phase. The results of extraction are shown in Table 2.

TABLE 2

| Organic phase (ml) | Silver concentration (g/L) | Amount of residues (g) | Content of silver in residues (%) | Ratio of silver extraction (%) |
|---|---|---|---|---|
| 75.8 | 52.6 | 3.95 | 2.00 | 98.1 |

It is noted from Table 2 that the process of the present invention permits the extraction and separation of silver in high ratios even from the raw material containing slightly soluble silver such as slime residues which have a complex composition, if the raw material is readily dispersible.

50 ml of the organic phase (containing 52.6 g of silver per liter) was shaken for 10 minutes with 50 ml of aqueous solution of sodium sulfite ($Na_2SO_3$). After separation from the aqueous phase, the organic phase was shaken for 10 minutes with 50 ml of fresh aqueous solution of $Na_2SO_3$. The organic phase was separated from the aqueous phase. The stripping was repeated five times. The results obtained in each stage of stripping are shown in Table 3.

TABLE 3

| Backward extraction | Amount of liquid (ml) | Concentration of silver (g/L) | Stripping ratio (A) (%) | Accumulation ratio of (A) (%) |
|---|---|---|---|---|
| First | 47.8 | 18.1 | 33.4 | 33.4 |
| Second | 48.0 | 15.6 | 28.9 | 62.4 |
| Third | 48.0 | 10.4 | 19.3 | 81.6 |
| Fourth | 47.7 | 5.67 | 10.4 | 92.1 |
| Fifth | 47.8 | 2.8 | 5.17 | 97.3 |
| Total | — | 52.57 | — | 100.0 |
| Remaining organic phase | 47.5 | 1.49 | — | — |

It is noted from the foregoing that upon stripping with aqueous solution of sodium sulfite, the silver compound in the organic phase moves into the aqueous phase and stays there in the form of very stable adduct and that five repetitions of stripping allowed more than 97% of silver to be stripped. Incidentally, the sodium sulfite may be replaced by any alkali sulfite to give almost the same results as above.

The stripping solution obtained by the above-mentioned five-step stripping was given as much NaOH as 1.3 times (in mol) the amount of silver. Upon heating to 90° C., silver powder began to separate out. This temperature was maintained until the oxidation reduction potential (ORP) became constant. The time 70 minutes after that was regarded as the end point of reduction reaction. Eventually, ORP was −128 mV and pH was 13.14. The total amount of silver eventually recovered by this reduction was 2.52 g and the direct recovery ratio of silver was 93.8%. Incidentally, the overall actual recovery ratio will exceed 98% because the residues of solvent extraction are returned to the pyrometallugical process, the silver remaining in the extract is removed by the next stripping, and the silver remaining in the stripping solution after reduction is recovered in the next step of reduction.

EXAMPLE 2

A sample of anode slime (50 g) was treated with chlorine to give a silver concentrate (residues) having the composition as shown in Table 4.

TABLE 4

Composition of silver concentrate (residues remaining after chlorine leaching) (wt % in wet state)

| Au | Cu | Pb | Se | Ag | Pt | Pd | Te |
|---|---|---|---|---|---|---|---|
| 0.13 | 0.32 | 38.2 | 0.37 | 13.4 | 0.05 | 0.008 | 0.82 |

To 13.1 g of the residues was added 43.5 g of water to give a slurry having a concentration of about 300 g/L. This slurry was given sodium hydrogen sulfite ($NaHSO_3$) at 90° C. until ORP reached 170 mV, so that part (mostly gold) of impurities was reduced into metal or simple substance. (The amount of $NaHSO_3$ consumed was 0.5 g.)

The remaining slurry was given 76.5 ml of CLEANSOL G solution containing 444 g/L of CYANEX 471X and 53.5 g/L of p-nonylphenol. The slurry was stirred for 1 hour to extract silver. Residues remaining after extraction were washed with alcohol, and the washing was given water to separate the organic phase. The separated organic phase was combined with the main organic phase. The combined organic phase was filtered by gravity.

The filtered organic phase was shaken for 10 minutes with an equal amount of aqueous solution of $Na_2SO_3$ (250 g/L)

to carry out stripping once. The resulting extract was given NaOH in an amount of one equivalent of silver. The solution was heated to 90° C. until the ORP decreased to the lower limit. The time when a sample of mother liquor gave no black precipitates any longer upon reaction with Sodium Tetrahydroborate was regarded as the end point. The silver powder thus obtained was washed with water and vacuum-dried at room temperature. The dried sample was analyzed by emission spectrophotometry.

For the purpose of comparison, the same procedure as above was repeated except that the residues remaining after chlorine leaching were not reduced with $NaHSO_3$. The results are shown in Table 5.

TABLE 5

Qualitative results of emission spectrophotometry of major elements in reduced silver

| Reduction | Cr | Ca | Na | Cu | Al | Bi | Ni | Fe |
|---|---|---|---|---|---|---|---|---|
| No | ± | 2+ | 2+ | 2+ | + | 2+ | (±) | + |
| Yes | (±) | 5+ | (±) | 3+ | + | 2+ | ± | 2+ |

| Reduction | Si | Mg | Sn | Pb | Pt | Sb | Au | Pd |
|---|---|---|---|---|---|---|---|---|
| No | 2+ | 3+ | — | — | (±) | (±) | 5+ | — |
| Yes | 2+ | 5+ | (±) | + | — | + | + | — |

It is noted from the foregoing that reduction performed on the residues left after chlorine leaching greatly reduces the amount of Pt and Au entering silver. (Pt and Au are reduced more readily than silver.) The content of Au in the recovered silver is of the order of 100 ppm (for 5+) and 1 ppm (for +). Incidentally, the recovered silver does not contain Pd (which poses a problem in electrolytic purification of silver) because Pd is not extracted in the process of the present invention and hence Pd does not enter the organic phase regardless of whether reduction is performed on the raw material or not.

EXAMPLE 3

A sample of residues of anode slime left after chlorine leaching was used as the raw material. The composition of this sample is shown in Table 6. This sample was tested for the effect of solvent on its solubility in the organic phase and the aqueous phase at the time of silver extraction. Incidentally, the residues are hardly dispersible because of strong aggregation.

TABLE 6

Composition of silver concentrate (residues remaining after chlorine leaching) (wt % in wet state)

| Au | Cu | Pb | Se | Ag | Pt | Pd | Te |
|---|---|---|---|---|---|---|---|
| 0.011 | 0.23 | 31.0 | 2.11 | 16.9 | 0.007 | 0.007 | 0.42 |

16.6 g of the residues (remaining after chlorine leaching) was given 200 ml of methanol and 50 ml of CLEANSOL G solution containing 444 g/L of CYANEX 471X and 53.5 g/L of p-nonylphenol. The mixture was stirred for 1 hour with vanes running at 500 rpm. For the purpose of comparison, the same procedure as mentioned above was repeated except that 200 ml of methanol was replaced by 30 ml of pure water.

After stirring, the mixture was centrifuged to separate the organic phase. The residues were washed with alcohol, and the washing (alcohol) was mixed with water and the organic phase which had been released was recovered. The above-mentioned procedure was repeated three times to confirm reproducibility. The results of extraction of silver into the organic phase are shown in Table 7. Incidentally, the ratio of extraction was obtained from the distribution of silver between the organic phase and the residues.

TABLE 7

| | Methanol added | | | Methanol not added | | |
|---|---|---|---|---|---|---|
| Extraction | Amount of residues (%) | Content of silver in residues (%) | Ratio of extraction (%) | Amount of residues (%) | Content of silver in residues (%) | Ratio of extraction (%) |
| First | 10.60 | 0.31 | 98.9 | 12.73 | 14.1 | 35.6 |
| Second | 10.59 | 0.25 | 99.1 | 13.06 | 15.3 | 28.0 |
| Third | 10.58 | 0.19 | 99.3 | 12.99 | 15.0 | 29.2 |
| Average | | | 99.1± 0.2 | | | 30.9± 3.3 |

It is noted from the foregoing that if a solvent which dissolves both the organic phase and the aqueous phase is added at the time of extraction of silver, it is possible to greatly improve the ratio of extraction of silver even though the residues left after chlorine leaching is poor in dispersibility. For residues having good dispersibility, the ratio of extraction without alcohol was 62.7% in the case of extraction by stirring under the same conditions as mentioned above and 98.0% in the case of extraction by shaking.

EXAMPLE 4

A sample of residues of anode slime left after chlorine leaching was used as the raw material. The composition of this sample is shown in Table 8. This sample (16 g) was given 50 ml of CLEANSOL G solution containing 444 g/L of CYANEX 471X, 53.5 g/L of p-nonylphenol, and a nonionic surface active agent shown in Table 9. The resulting mixture was given 20 ml of pure water and stirred for 1 hour by a two-vane stirrer in a 100 ml beaker. The ratio of extraction of silver into the organic phase varied depending on the kind and amount of the nonionic surface active agent as shown in Table 9.

TABLE 8

Composition of silver concentrate (residues remaining after chlorine leaching) (wt % in wet state)

| Au | Cu | Pb | Se | Ag | Pt | Pd | Te |
|---|---|---|---|---|---|---|---|
| 0.002 | 0.19 | 31.7 | 0.27 | 14.9 | 0.002 | 0.002 | 0.3 |

TABLE 9

| Nonionic surface active agent | Amount added (g/L) | Ratio of extraction (%) |
|---|---|---|
| None | 0 | 46.4 |
| Emulgen PI-20T | 3 | 97.9 |
| Emulgen 906 | 3 | 70.5 |
| Cleanthrough LC-2500 | 20 | 98.7 |

It is noted from Table 9 that the nonionic surface active agent improves the mixing of three phases (i.e., organic phase, aqueous phase, and residues) and also improves the ratio of extraction of silver into the organic phase. It is also noted that the ratio of extraction is slightly low in the case of EMULGEN 906 which does not dissolve completely in the aqueous phase. This suggests that the kind of nonionic surface active agent is also an important factor.

EXAMPLE 5

In view of the fact that when residues of anode slime remaining after chlorine leaching are extracted with an organic solvent solution containing CYANEX 471X, the resulting organic phase contains less than 1 ppm of impurities (excluding gold), samples of aqueous slurry were prepared as hypothetical raw materials, each containing 58.4 g/L of silver chloride and 1 g/L of a chloride of Cu, Bi, or Pb. The samples were tested for the selectivity of the washing solution in the following manner.

The slurry (250 ml) was mixed with 250 ml of CLEANSOL G solution containing 444 g/L of CYANEX 471X and 53.3 g/L of p-nonylphenol. The mixture was shaken for 1 hour to give the organic phase which has the composition shown in Table 10. The ratio of extraction was 99.88% for silver, 1.3% for copper, and 1.4% for lead. Precipitates resulting from hydrolysis were filtered out.

TABLE 10

| Composition of the organic phase (g/L) | | | |
|---|---|---|---|
| Ag | Cu | Bi | Pb |
| 49.8 | 0.0119 | <0.001 | 0.0133 |

The organic phase was divided into three portions, and each portion was shaken for 10 minutes with an equal amount of sulfuric acid (2 to 6N), tartaric acid (0.5 mol/L), or EDTA (0.25 mol/L, pH 5.61). The composition of each organic phase after washing is shown in Table 11. The composition of each aqueous phase after washing is shown in Table 12. The ratio of removal of each element by washing is shown in Table 13.

TABLE 11

| Composition of organic phase after washing (g/L) | | | | |
|---|---|---|---|---|
| Washing liquid | Ag | Cu | Bi | Pb |
| $H_2SO_4$ (2N) | 49.6 | 0.0039 | <0.0001 | <0.0001 |
| $H_2SO_4$ (4N) | 48.0 | 0.0038 | <0.0001 | <0.0001 |
| $H_2SO_4$ (6N) | 48.0 | 0.0040 | <0.0001 | <0.0001 |
| EDTA | 51.1 | <0.0001 | <0.0001 | <0.0001 |
| Tartaric acid | 50.8 | 0.0049 | <0.0001 | <0.0001 |

TABLE 12

| Composition of aqueous phase after washing (g/L) | | | | |
|---|---|---|---|---|
| Washing liquid | Ag | Cu | Bi | Pb |
| $H_2SO_4$ (2N) | <0.001 | <0.001 | <0.001 | 0.007 |
| $H_2SO_4$ (4N) | <0.001 | <0.001 | <0.001 | 0.005 |
| $H_2SO_4$ (6N) | <0.001 | <0.001 | <0.001 | 0.004 |
| EDTA | 0.003 | 0.004 | 0.002 | 0.019 |
| Tartaric acid | <0.001 | <0.001 | 0.002 | 0.021 |

TABLE 13

| Ratio of removal of each element by washing (%) | | | | |
|---|---|---|---|---|
| Washing liquid | Ag | Cu | Bi | Pb |
| $H_2SO_4$ (2N) | <0.002 | <19 | — | >98.5 |
| $H_2SO_4$ (4N) | <0.002 | <21 | — | >98.0 |
| $H_2SO_4$ (6N) | <0.002 | <19 | — | >97.5 |
| EDTA | 0.006 | >97.6 | >95.4 | >99.5 |
| Tartaric acid | <0.002 | <17 | >95.2 | >99.5 |

It is noted from the foregoing that washing with EDTA (one kind of aminocarboxylic acid) reduces the content of major impurities (such as copper, bismuth, and lead) in the organic phase below 0.1 mg/L, while losing silver only 0.006 wt %. By contrast, sulfuric acid and tartaric acid (a carboxylic acid which easily forms a complex) are poor in ability to wash out copper.

EXAMPLE 6

A sample of residues of anode slime left after chlorine leaching was used as the raw material. The composition of this sample is shown in Table 14. This sample (80.2 g) was given 243 ml of CLEANSOL G solution containing 444 g/L of CYANEX 471X, 53.5 g/L of p-nonylphenol, and 97 ml of methanol. The resulting mixture was stirred for 1 hour to give the organic phase having the composition as shown in Table 15.

TABLE 14

| Composition of silver concentrate (residues remaining after chlorine leaching) (wt % in wet state) | | | | | | | |
|---|---|---|---|---|---|---|---|
| Au | Cu | Pb | Se | Ag | Pt | Pd | Te |
| 0.032 | 0.19 | 23.0 | 0.13 | 13.8 | 0.011 | 0.018 | 0.63 |

TABLE 15

| Composition of the extracted organic phase | | |
|---|---|---|
| Au | Si | Ag |
| 42 mg/L | <1 mg/L | 39.3 g/L |

The resulting organic phase was given activated carbon ("Kuraraycoal" from Kuraray Chemical Corporation) in varied amounts as shown in Table 16. After stirring for 1 hour, the organic phase was washed with an equal amount of aqueous solution containing 0.25 mol/L of EDTA (pH 6.5). The washed organic phase was stripped backward three times with an equal amount of aqueous solution containing 250 g/L of $Na_2SO_3$.

The three extracts were combined and given NaOH (enough for the final solution to contain 0.28 mol/L of NaOH). The solution was heated at 90° C. for 2 hours so that silver separated out by reduction. The recovered silver powder was washed with 125 ml of concentrated hydrochloric acid by stirring at 90° C. for 1 hour. The amount of impurities in the recovered silver varies depending on the amount of activated carbon added, as shown in Table 16.

TABLE 16

| Amount of activated | Amount of impurities in recovered silver (ppm) | | | | |
|---|---|---|---|---|---|
| | Au | Si | Al | Pd | Te |
| 3.3 | <1 | 1.2 | 1.0 | <0.05 | 0.5 |
| 6.7 | <1 | 0.4 | 3.2 | <0.05 | 0.1 |
| 13.3 | <1 | 0.8 | 0.7 | <0.05 | 0.4 |

It is noted from Table 16 that activated carbon added to the organic phase reduces the amount of major elements (capable of adsorption) below 1 ppm.

EXAMPLE 7

A sample of residues remaining after chlorine leaching was used as the raw material. This raw material has the same composition as that in Example 2. This raw material (40 g) was suspended in 133 ml of water, and the resulting slurry was given sodium sulfite until an ORP of 135 mV and pH 4.43 were reached. Stirring was continued for 0.5 hour until the potential became stable. The amount of sodium sulfite added was 0.6 g.

After treatment for reduction, the slurry was mixed with 235 ml of CLEANSOL G solution containing 444 g/L of CYANEX 471X and 53.5 g/L of p-nonylphenol. The mixture was stirred for 1 hour to extract silver and then centrifuged to recover the organic phase (229 ml, equivalent to 98%). The recovered organic phase was mixed (for washing) with an equal amount of aqueous solution containing 0.2 mol/L of EDTA (pH 6.5).

The organic phase was stripped three times with three times as much aqueous solution containing 250 g/L of sodium sulfite as the amount of the organic phase. The stripped solution was given 4.5 ml of aqueous solution containing 500 g/L of sodium hydroxide. The solution was heated to 90° C. and was given additional 1 g of sodium hydroxide so as to speed up the rise of ORP. Reduction was carried out until the ORP eventually reached −98 mV (minimum).

This reduction caused silver powder to separate out. Two-thirds of the silver powder recovered was washed with 10 ml of hydrochloric acid by stirring at 90° C. for 1 hour and then washed with water. One half of the washed silver powder was further washed with water and melted at 1050° C. for 30 minutes. The silver was peeled off from the alumina boat by treatment with molten sodium hydroxide. The peeled silver was washed with acid and then with water at room temperature.

The recovered silver without washing and the recovered silver which had been washed with acid and melted were tested for the content of impurities. The results are shown in Table 17. For the purpose of comparison, the same anode slime as used above was purified by dry process and the purified silver was made into a silver anode. This anode was used for electrolytic purification in a nitric acid bath. The resulting silver flake was also tested for impurities. The results are shown in Table 17. Incidentally, impurities shown in Table 17 are only those elements which were detected by emission spectrophotometry.

TABLE 17

| Impurities | Content of impurities in silver (ppm) | | | |
|---|---|---|---|---|
| | Untreated sample | Washed sample | Melted sample | Electrolyzed sample |
| Mg | 24 | 2.1 | 0.7 | <0.05 |
| Al | 36 | 8.5 | 3.6 | 0.1 |
| Si | 64 | 19 | 6.6 | 0.2 |
| Ca | 3 | 3 | <0.5 | <0.05 |
| Fe | 42 | 9.2 | 0.7 | <0.05 |
| Cu | 4.3 | 2.2 | 0.6 | 1.3 |
| Au | 2.7 | 2.4 | 2 | <0.1 |
| Pb | 32 | 5.1 | <0.05 | 0.4 |
| Bi | 8.4 | 0.9 | 0.2 | <0.05 |
| Total | 216.4 | 62.4 | 14.4 | 2 |

It is noted from the foregoing that simple washing with acid greatly reduces the content of impurities (to 4N) in the recovered silver, and the subsequent melting reduces the content of Cu and Pb more than electrolysis.

[Effect of the Invention]

The process of the present invention permits selective extraction of silver from a raw material containing silver in the form of slightly soluble compounds owing to the extraction with an organic solvent solution of a sulfur-containing organophosphorus compound, and also permits effective recovery of metallic silver by stripping and subsequent pH adjustment of the resulting solution.

The process of the present invention involves pretreatment (by reduction) of a raw material containing slightly soluble silver compounds and treatment of the organic phase containing extracted silver (by washing or adsorption by activated carbon), so that it permits recovery of high-purity silver without electrolytic purification. The recovered silver can be purified further by acid washing and melting in an environment where external contamination is reduced.

What is claimed is:

1. A process for extracting and recovering silver from raw material containing slightly soluble silver chloride which includes the steps of mixing the raw material with an organic solvent solution of an organophosphorus compound containing in the molecule sulfur in the form of $S^{2-}$ ions, thereby extracting silver into an organic phase simultaneously with dissolving the slightly soluble silver chloride, stripping the silver from the organic phase containing the extracted silver with an aqueous solution of alkali sulfite and forming a stripping solution, and reducing the stripping solution to separate silver therefrom.

2. The process for extracting and recovering silver as defined in claim 1, wherein the organophosphorus compound is selected from the group consisting of trialkylphosphine sulfide, dialkylmonothiophosphinic acid, dialkyldithiophosphinic acid, and alkyl monothiophosphate.

3. The process for extracting and recovering silver as defined in claim 1, including mixing the raw material containing slightly soluble silver chloride with a reducing agent before mixing with the organic solvent solution of the organophosphorus compound to reduce and remove impurities therein which are more readily reduced than silver.

4. The process for extracting and recovering silver as defined in claim 3, wherein the reducing agent is selected from the group consisting of sulfur dioxide, sulfite, hydrazine and salt thereof, and oxalic acid.

5. The process for extracting and recovering silver as defined in claim 1, wherein the raw material containing slightly soluble silver chloride is mixed with the organic solvent solution containing the organophosphorus compound simultaneously with the addition, in the presence of an aqueous phase, of a solvent which dissolves both the organic phase and the aqueous phase.

6. The process for extracting and recovering silver as defined in claim 5, wherein the solvent which dissolves both the organic phase and the aqueous phase is selected from the group consisting of acetone, methanol, ethanol, isopropanol, DMF, and DMSO.

7. The process for extracting and recovering silver as defined in claim 1, wherein the raw material containing slightly soluble silver chloride is mixed with the organic solvent solution containing the organophosphorus compound simultaneously with the addition, in the presence of an aqueous phase, of a nonionic surface active agent which does not react with metal ions.

8. The process for extracting and recovering silver as defined in claim 7, wherein the nonionic surface active agent is soluble in water but only slightly extracted into the organic phase.

9. The process for extracting and recovering silver as defined in claim 8, wherein the nonionic surface active agent is selected from the group consisting of polyoxethylene-nonyl-phenyl-ether and aromatic glycol surfactant, and is added in an amount of 1 to 20 g/L for the amount of the organic phase.

10. The process for extracting and recovering silver as defined in claim 1, wherein the raw material containing slightly soluble silver chloride is mixed with the organic solvent solution containing the organophosphorus compound by stirring with a marine propeller or pitched turbine for uniform mixing.

11. The process for extracting and recovering silver as defined in claim 1, wherein the organic phase into which silver has been extracted is washed with an aqueous solution containing a complex-forming agent.

12. The process for extracting and recovering silver as defined in claim 11, wherein the complex-forming agent is an aminocarboxylic acid compound.

13. The process for extracting and recovering silver as defined in claim 1, wherein the organic phase into which silver has been extracted is brought into contact with activated carbon.

14. The process for extracting and recovering silver as defined in claim 1, wherein the stripping solution is adjusted to pH 10 or above and 60° C. and above, thereby causing silver to separate out by reduction.

15. The process for extracting and recovering silver as defined in claim 14, wherein the stripping solution is maintained at pH 12 or above and 60° C. and above for about 1 hour, thereby causing silver to separate out by reduction.

16. The process for extracting and recovering silver as defined in claim 1, wherein the silver which has separated out by reduction is washed with acid.

17. The process for extracting and recovering silver as defined in claim 1, wherein the raw material containing slightly soluble silver chloride is a solid containing slightly soluble silver chloride which occurs in the course of smelting of noble metals and treatment of plating solution and photographic developing solution.

18. The process for extracting and recovering silver as defined in claim 1, wherein the silver which has separated out by reduction is melted or dissolved.

* * * * *